(12) United States Patent
Elshafie et al.

(10) Patent No.: US 11,917,442 B2
(45) Date of Patent: Feb. 27, 2024

(54) DATA TRANSMISSION CONFIGURATION UTILIZING A STATE INDICATION

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US); Krishna Kiran Mukkavilli, San Diego, CA (US); Jay Kumar Sundararajan, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 17/482,121

(22) Filed: Sep. 22, 2021

(65) Prior Publication Data
US 2022/0095146 A1 Mar. 24, 2022

Related U.S. Application Data

(60) Provisional application No. 63/082,436, filed on Sep. 23, 2020.

(51) Int. Cl.
*G06N 20/00* (2019.01)
*H04B 17/373* (2015.01)
(Continued)

(52) U.S. Cl.
CPC .............. *H04W 24/10* (2013.01); *G06N 3/02* (2013.01); *G06N 20/00* (2019.01); *H04B 17/373* (2015.01);
(Continued)

(58) Field of Classification Search
CPC ....... G06N 3/02–105; G06N 5/01–048; G06N 7/01–08; G06N 20/00–20;
(Continued)

(56) References Cited

U.S. PATENT DOCUMENTS

2008/0095185 A1\* 4/2008 DiGirolamo .......... H04W 24/10
2015/0085685 A1\* 3/2015 Majjigi ................. H04W 24/10
(Continued)

FOREIGN PATENT DOCUMENTS

WO 2015043233 A1 4/2015
WO 2019216740 A1 11/2019

OTHER PUBLICATIONS

International Search Report and Written Opinion—PCT/US2021/051727—ISA/EPO—dated Dec. 9, 2021.

*Primary Examiner* — Timothy J Weidner
(74) *Attorney, Agent, or Firm* — Sevan Savsa; Patterson & Sheridan LLP

(57) ABSTRACT

Certain aspects of the present disclosure provide techniques for configuring data transmission. Aspects relate to determining a data transmission configuration utilizing a machine-learning based algorithm, such as a data transmission configuration for ultra-reliable low-latency communication (URLLC) applications. A method that may be performed by a base station (BS) includes receiving a feedback report from a user equipment (UE) including an indication of a first state corresponding to a plurality of channel condition parameters and determining one or more actions based, at least in part, on the first state. The BS may determining the one or more actions utilizing a machine learning algorithm that uses a second state, where the second state is based, at least in part, on the first state.

28 Claims, 12 Drawing Sheets

(51) Int. Cl.
  *H04B 17/391* (2015.01)
  *H04L 1/00* (2006.01)
  *H04L 1/1812* (2023.01)
  *H04L 41/147* (2022.01)
  *H04L 41/16* (2022.01)
  *H04W 8/22* (2009.01)
  *H04W 16/22* (2009.01)
  *H04W 24/08* (2009.01)
  *H04W 24/10* (2009.01)
  *H04W 28/04* (2009.01)
  *H04W 28/06* (2009.01)
  *H04W 84/02* (2009.01)
  *H04W 88/02* (2009.01)
  *H04W 88/08* (2009.01)
  *H04W 92/02* (2009.01)
  *H04W 92/10* (2009.01)
  *G06N 3/02* (2006.01)

(52) U.S. Cl.
  CPC ......... *H04B 17/3913* (2015.01); *H04L 1/002* (2013.01); *H04L 1/1812* (2013.01); *H04L 41/147* (2013.01); *H04L 41/16* (2013.01); *H04W 8/22* (2013.01); *H04W 16/22* (2013.01); *H04W 24/08* (2013.01); *H04W 28/04* (2013.01); *H04W 28/06* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
  CPC ......... H04B 17/0082–409; H04L 1/0001–248; H04L 41/14–40; H04L 43/02–55; H04W 8/22–245; H04W 16/18–225; H04W 24/02–10; H04W 28/02–26; H04W 36/0005–385; H04W 48/02–20; H04W 72/02–569; H04W 74/002–008; H04W 76/10–50; H04W 84/02–16; H04W 88/02–12; H04W 92/02–04; H04W 92/10
  See application file for complete search history.

(56) References Cited

U.S. PATENT DOCUMENTS

2016/0344458 A1   11/2016   Zhao et al.
2018/0294849 A1   10/2018   Chen et al.
2018/0295631 A1*   10/2018   Fröberg Olsson .. H04W 72/541

* cited by examiner

DATA TRANSMISSION CONFIGURATION UTILIZING A STATE INDICATION

CROSS-REFERENCE TO RELATED APPLICATION(S)

This application claims benefit of and priority to U.S. Provisional Application No. 63/082,436, filed Sep. 23, 2020, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for configuring data transmission.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Features of this disclosure provide advantages that include improved data transmission configuration in ultra-reliable low-latency communication (URLLC) applications by utilizing a machine-learning based algorithm.

Certain aspects of the subject matter described in this disclosure can be implemented in a method for wireless communication by a base station (BS). The method generally includes receiving a feedback report from a user equipment (UE) including an indication of a first state corresponding to a plurality of channel condition parameters. The method generally includes determining one or more actions based, at least in part, on the first state.

Certain aspects of the subject matter described in this disclosure can be implemented in a method for wireless communication by a UE. The method generally includes receiving signaling, from a BS, a configuring a mapping of state indices to channel condition parameters. The method generally includes monitoring a transmission from the BS. The method generally includes sending the BS a feedback report for the monitored transmission, the feedback report including an indication of a first state index, based on the mapping, corresponding to a plurality of channel condition parameters.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
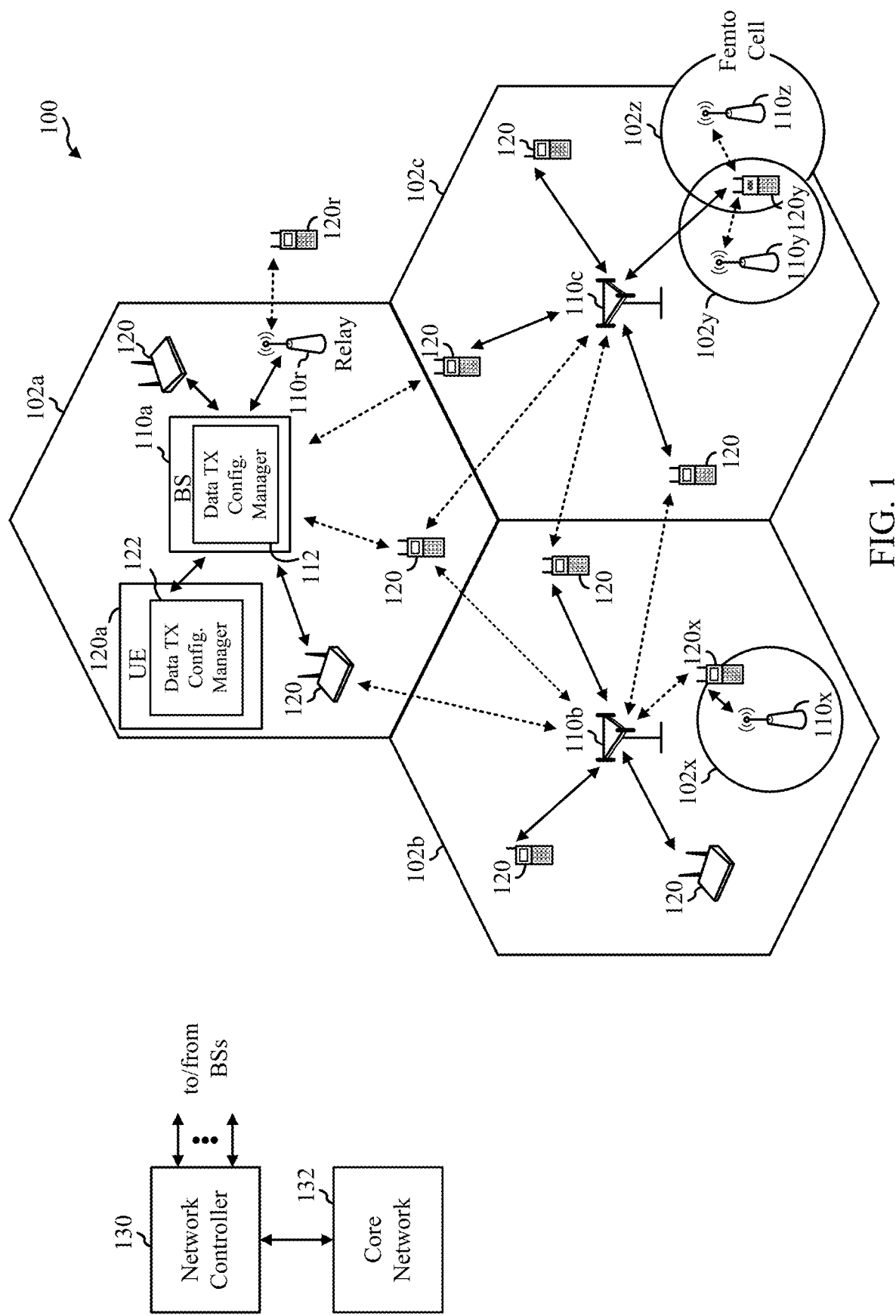
FIG. 1 is a block diagram conceptually illustrating an example wireless communication network, in accordance with certain aspects of the present disclosure.

Aspects of the present disclosure provide apparatus, methods, processing systems, and computer readable mediums for determining a data transmission configuration. In some examples, the data transmission configuration is determined utilizing a machine learning-based algorithm. In some examples, the transmission configuration is a data transmission configuration for ultra-reliable low-latency communication (URLLC) applications.

A state can be associated with a plurality of channel conditions. Sets of channel conditions can be mapped to state indices. The mapping of state indices to set of channel conditions can be configured at a user equipment (UE). The UE can use a state index to indicate a set of currently observed channel conditions. Based on the state index, a base station (BS) can determine one or more actions associated with a transmission configuration. The BS may use machine learning to determine the transmission configuration and/or the actions to be taken (e.g., to configure the transmission configuration). In some examples, a BS may receive an indication of a first state index, from a UE, in a feedback report and determine one or more actions based, at least in part, on the first state index. The BS may use a machine learning algorithm to predict a data transmission configuration that produces a desired reward parameter or, in other words, that produces a maximized or minimized objective function, which helps to maintain desired URLLC reliability requirements.

The following description provides examples of data transmission configuration for URLLC applications utilizing a machine learning-based algorithm in communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting URLLC. These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, wireless communication network 100 may be an NR system (e.g., a 5G NR network). As shown in FIG. 1, wireless communication network 100 may be in communication with a core network 132. Core network 132 may be in communication with one or more BSs 110a-z (each also individually referred to herein as BS 110 or collectively as BSs 110) and/or UEs 120a-y (each also individually referred to herein as UE 120 or collectively as UEs 120) in wireless communication network 100 via one or more interfaces.

According to certain aspects, BSs 110 and UEs 120 may be configured for data transmission configuration in URLLC applications. As shown in FIG. 1, BS 110a includes a data transmission configuration manager 112. Data transmission configuration manager 112 may be configured to receive a first state from UE 120a in a feedback report, the first state corresponding to a plurality of channel conditions. Data transmission configuration manager 112 may be configured to determine one or more actions based, at least in part, on the first state, in accordance with aspects of the present disclosure. As shown in FIG. 1, UE 120a includes a data transmission configuration manager 122. Data transmission configuration manager 122 may be configured to monitor a transmission and send BS 110a a feedback report for the monitored transmission, the feedback report including an indication of the first state, in accordance with aspects of the present disclosure.

A BS 110 may provide communication coverage for a particular geographic area, sometimes referred to as a "cell", which may be stationary or may move according to the location of a mobile BS 110. In some examples, BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b and 110c may be macro BSs for the macro cells 102a, 102b and 102c, respectively. BS 110x may be a pico BS for a pico cell 102x. BSs 110y and 110z may be femto BSs for femto cells 102y and 102z, respectively. A BS may support one or multiple cells.

UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, network controller 130 may be in communication with core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
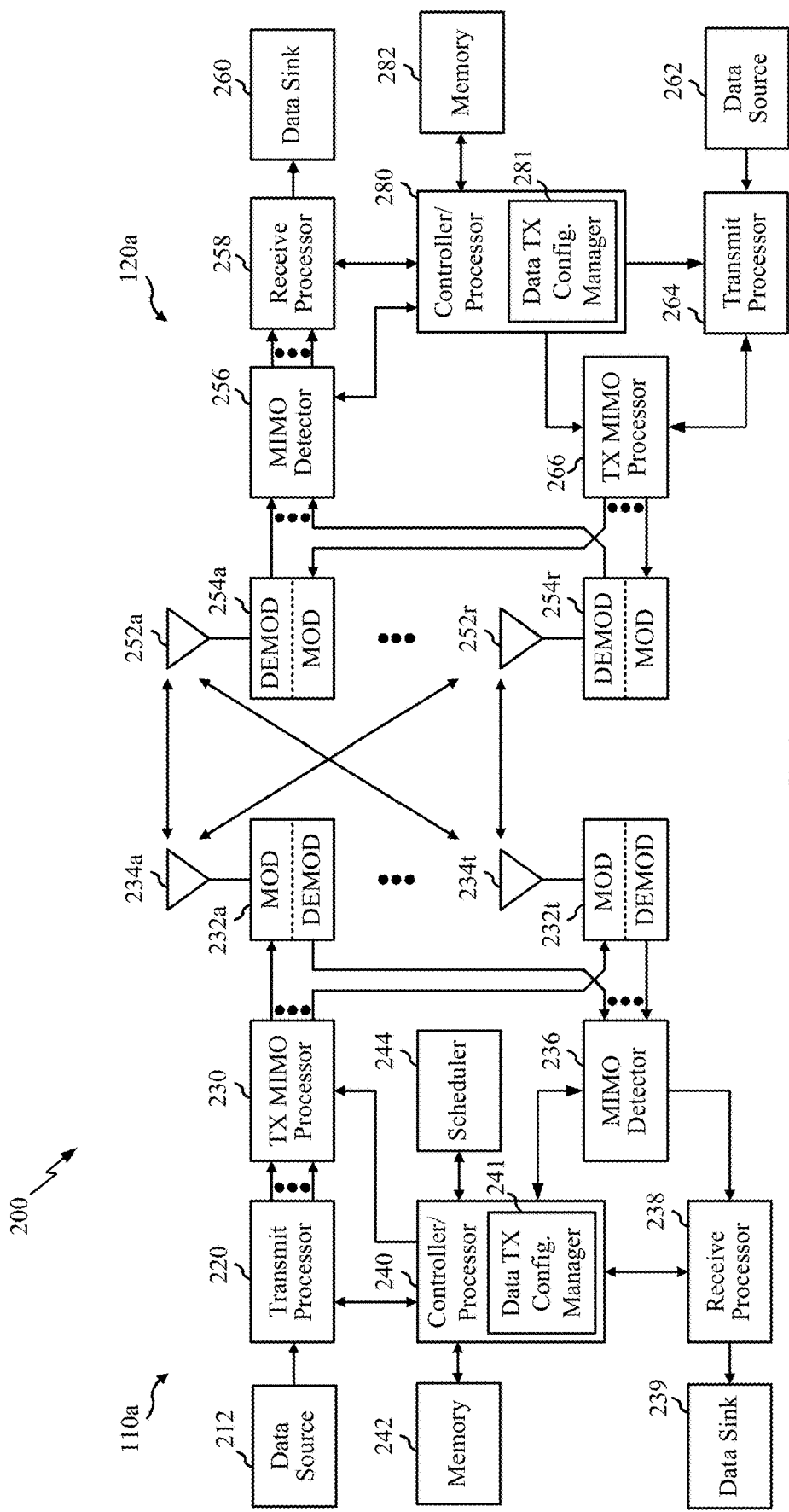
FIG. 2 is a block diagram conceptually illustrating aspects of an example base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 120a, antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from controller/processor 280. Transmit processor 264 may also generate reference symbols for a reference signal (e.g., for the sounding reference signal (SRS)). The symbols from transmit processor 264 may be precoded by a TX MIMO processor 266 if applicable, further processed by the modulators in transceivers 254a-254r (e.g., for SC-FDM, etc.), and transmitted to BS 110a. At BS 110a, the uplink signals from UE 120a may be received by antennas 234, processed by the demodulators in transceivers 232a-232t, detected by a MIMO detector 236 if applicable, and further processed by a receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of UE 120a and/or antennas 234, processors 220, 230, 238, and/or controller/processor 240 of BS 110a may be used to perform the various techniques and methods described herein. For example, as shown in FIG. 2, controller/processor 240 of the BS 110a has a data transmission configuration manager 241 (e.g., which may be the data transmission configuration manager 112 of FIG. 1) and controller/processor 280 of UE 120a has a data transmission configuration manager 281 (e.g., which may be the data transmission configuration manager 122 of FIG. 1). Although shown at the controller/processor, other components of UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
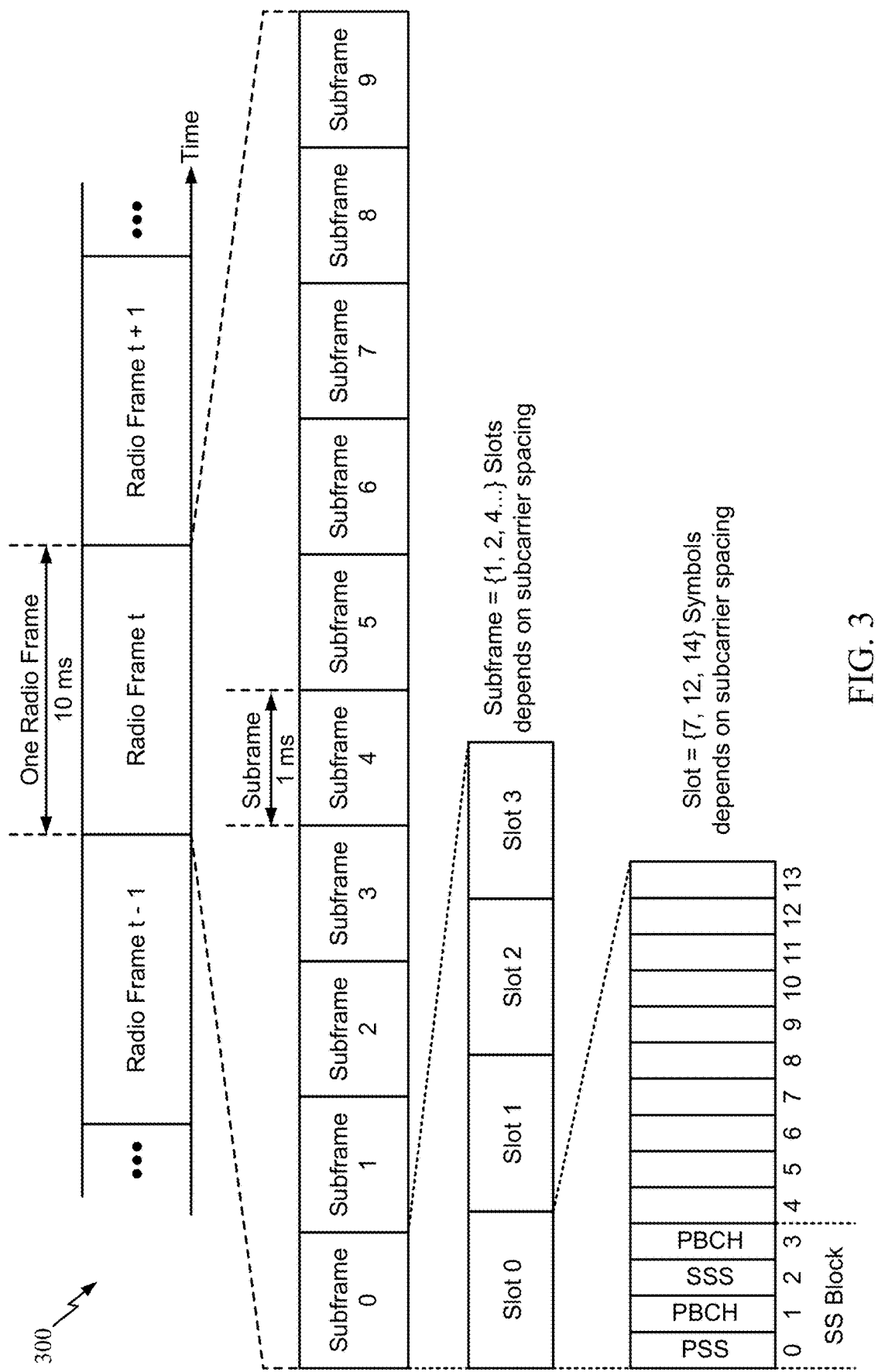
FIG. 3 is an example frame format for certain wireless communication systems, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

As mentioned above, NR access may support various wireless communication services, including URLLC. URLLC may be targeted for services like traffic control (e.g., control of autonomous vehicles) or remote control (e.g., drones or remote surgery), which require both high reliability and low latency.

Reliability can be defined as the capability of transmitting a given amount of traffic within a predetermined time duration with a high probability of success. To achieve ultra-reliable communication, the URLLC reliability requirement may be a maximum block error rate (BLER) of 1e-5 or 0.001%. In an example, in a URLLC application, when there are two transmissions and the first TX BLER is 10%, the second TX BLER must be 1e-4 to meet the required residual BLER of 1e-5. To maintain the desired BLER conditions in both transmissions, the UE may feed back to the network a channel state information (CSI) report and a hybrid automatic repeat request (HARQ) acknowledgement (ACK) or negative acknowledgement (NACK) report for a previous transmission by the BS.

Cellular systems include a mechanism allowing the UE to feed back to the network information about the channel conditions to assist the scheduler at the BS. Such feedback may include information about the observed BLER, observed channel quality indicators (CQI), observed precoding matrix indicators (PMI), observed best redundancy version (RV), etc. Such information may be synchronously sent with HARQ-ACK feedback.

Figure 4:
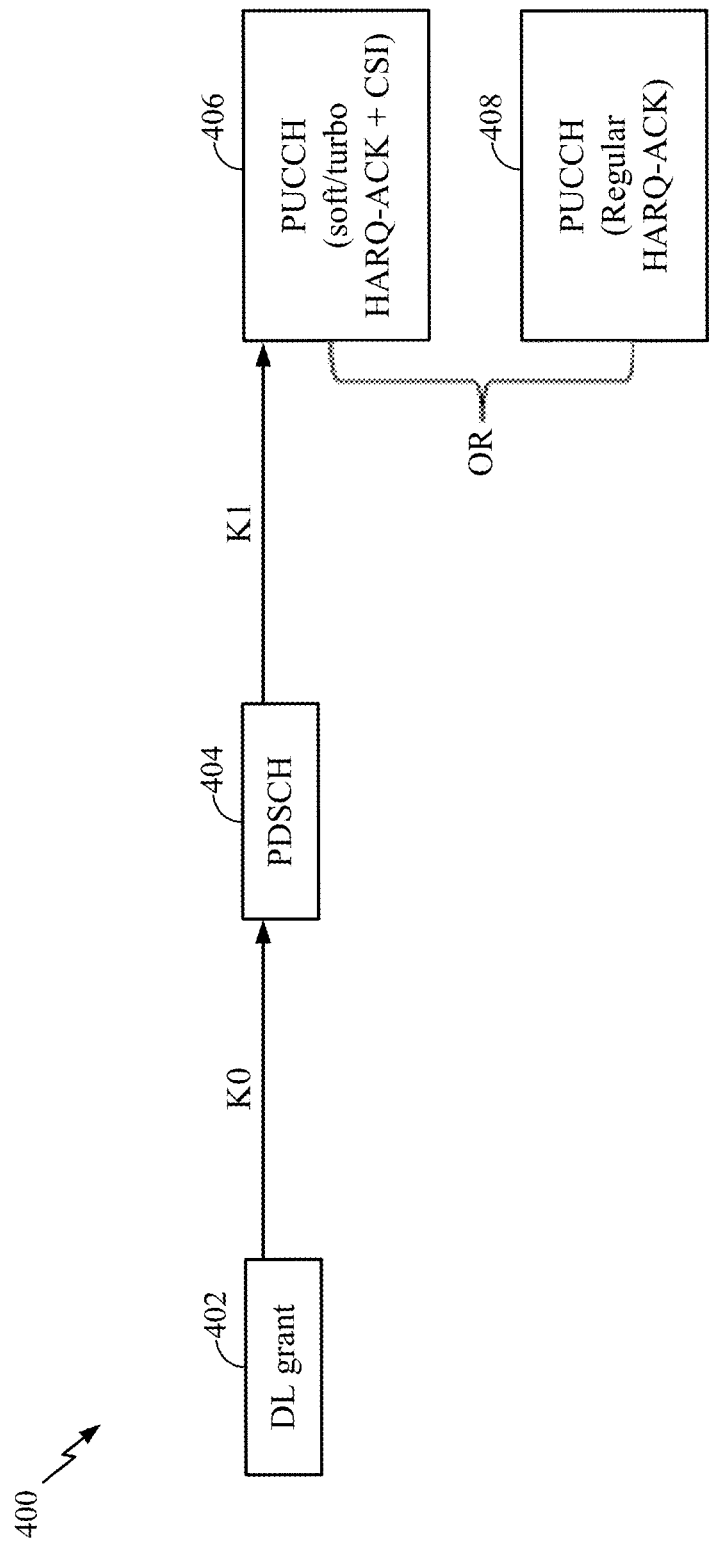
FIG. 4 illustrates an example hybrid automatic repeat request (HARQ) timeline, in accordance with aspects of the present disclosure.

HARQ is a component of data communication that ensures reliability and performance. FIG. 4 illustrates an example HARQ timeline 400. As shown in FIG. 4, the feedback of HARQ ACK/NACK information may include ACK/NACK information alone or also with channel condition information (e.g., a CSI report). The feedback process of HARQ ACK/NACK begins by the BS sending a downlink grant 402 to the UE. DL grant 402 may be carried in downlink control information (DCI) on the PDCCH. DL grant 402 may schedule a data transmission on a PDSCH 404. PDSCH 404 may be scheduled at a first DL slot that is after a delay period, K0, between DL grant 402 and the data transmission. The UE can provide HARQ-ACK feedback, in a HARQ-ACK feedback report, for PDSCH 404 in a second DL slot that is after another delay period, K1, between PDSCH 404 and HARQ-ACK feedback. The UE may send the HARQ-ACK feedback report in uplink control information (UCI) on a PUCCH (or in some cases, multiplexed on a PUSCH). The HARQ-ACK feedback report may be a regular HARQ-ACK report 406 that includes only the ACK/NACK feedback and does not include CSI. The HARQ-ACK feedback report may be a soft/turbo HARQ-ACK feedback report 408 that includes the ACK/NACK feedback and a CSI report. The UE may determine the HARQ ACK feedback (e.g., an ACK or a NACK) based on monitoring the scheduled PDSCH 404. The UE determines whether PDSCH 404 was successfully decoded. The CSI feedback may be generated based on measurements of the PDSCH or, in some cases, generated based on measurements of CSI-RS (e.g., which may be scheduled/activated by the DCI).

Example Data Transmission Configuration Utilizing a State Indication

Aspects of the present disclosure provide enhancements in determining a data transmission configuration utilizing a state indication. In some aspects, the state indication can be used in machine learning-based algorithm to determine a data transmission configuration. A data transmission configuration may be determined to maintain reliability and latency targets for ultra-reliable low-latency communication (URLLC) applications.

Figure 5:
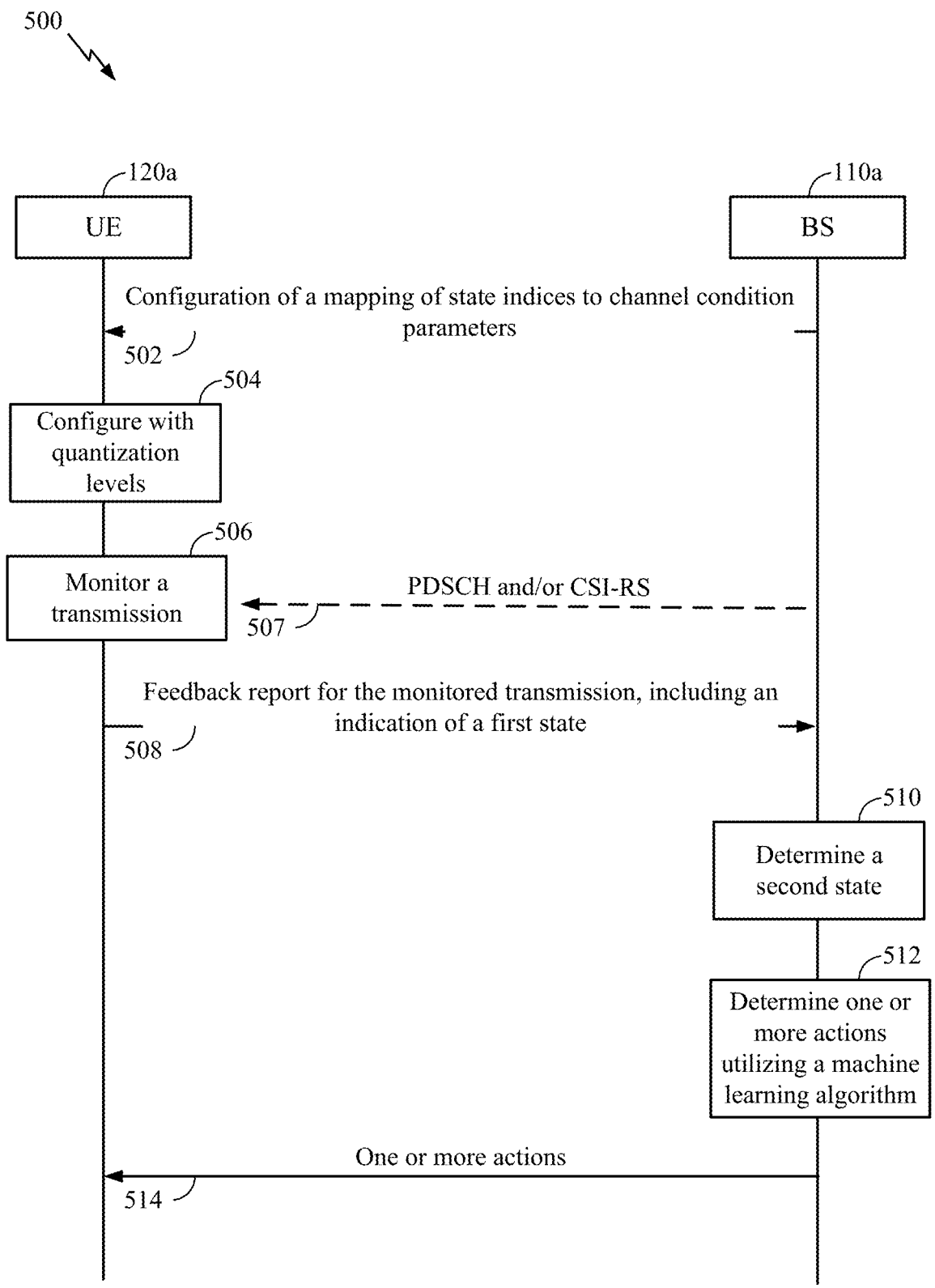
FIG. 5 is a call flow diagram illustrating example signaling for determining a data transmission configuration utilizing a machine learning based algorithm, in accordance with aspects of the present disclosure.

FIG. 5 is a call flow diagram illustrating example signaling 500 for determining a data transmission configuration utilizing a state indication, in accordance with aspects of the present disclosure. As shown in the example of FIG. 5, at 502, a base station (e.g., BS 110a) configures a user equipment (e.g., UE 120a) with a mapping of state indices to channel condition parameters. The configuration may also indicate a number of states, M, to be used at the UE side and/or the contents of the M states (e.g., the channel conditions parameters associated with each of the states). UE 120a may be configured with quantization levels for the channel condition parameters, at 504. BS 110a may also indicate the quantization levels to UE 120a for the channel condition parameters or quantization levels may be specified in a wireless standard or determined by UE 120a.

The channel condition parameters may include block error rate (BLER), log-likelihood ratio (LLR) quality, interference covariance matrix eigen-values, interference power, a number of negative acknowledged (NACKed) code blocks (CBs), a number of NACKed CB groups (CBGs), a channel quality indicator (CQI), a spectral efficiency (SPEF), a signal to noise ratio (SNR), a parity check status, a best observed redundancy version (RV), a current analog precoder used at the UE, a current digital precoder used at the UE, a best observed analog precoder at the UE, a best observed digital precoder at the UE, a best observed demodulation reference signal (DMRS) configuration, a current interference pattern in frequency, a current interference pattern in time, a current interference covariance matrix rank, a current interference power, and/or a best resource allocation at the UE.

The BS may configure the UE via radio resource control (RRC) signaling and/or medium access control (MAC) control element (CE) signaling.

At 506, UE 120a monitors a transmission 507 from BS 110a, which may be successfully or unsuccessfully received and decode by UE 120a. For example, UE 120a may monitor a physical downlink shared channel (PDSCH) transmission (e.g., such as the data transmission in PDSCH 404) scheduled by a downlink grant (e.g., such as DL grant 402) in downlink control information (DCI) and/or channel state information reference signals (CSI-RS) which may be activated by DCI. UE 120a can measure channel conditions with the reception of the PDSCH and/or CSI reference signals (CSI-RS). UE 120a can determine a state. For example, UE 120a can determine the state corresponding to the channel conditions based on the configured mapping of channel conditions to state indices. In some examples, a soft HARQ-ACK report maps to a state index.

At 508, UE 120a sends a feedback report for the monitored transmission as part of a hybrid automatic repeat request (HARD) acknowledgement (ACK) report. The feedback report includes a first state index (associated with a first state), based on the mapping, corresponding to a plurality of channel condition parameters (e.g., based on the monitored transmission at 506).

At 510, after BS 110a receives the feedback report including the indication of the first state index, BS 110a can determine a second state (e.g., a "super state") by adding the first state associated with the first state index sent by UE 120a to a state maintained at the BS 110a (e.g., a third state). For example, the state maintained by the BS may include a current set of channel condition parameters, such as a current resource allocation, a digital precoder at the BS, an analog precoder at the BS, a current modulation and coding scheme (MCS), a current data rank, a current action, a current demodulation reference signal (DMRS) configuration, and/or a current transmit power. Thus, when BS 110a receives the first state from UE 120a, the plurality of channel condition parameters corresponding to the first state can be added to the third state already maintained at BS 110a to determine the second state (e.g., the super state).

At 512, BS 110a determines one or more actions based on the super state (e.g., the second state determined at 510). The one or more actions may be associated with a data transmission configuration. According to certain aspects, BS 110a determines the one or more actions utilizing a machine learning algorithm. For example, BS 110a may input the determined super state (e.g., the second state) into a machine learning algorithm. The machine learning algorithm may be modeled as a Markov Decision Process (MDP). In some examples, the machine learning algorithm may be a reinforcement learning algorithm, a deep learning algorithm, a supervised learning algorithm, an unsupervised learning algorithm, a Q-learning algorithm, a value reinforcement algorithm, a polar reinforcement algorithm, or a combination thereof. BS 110a may solve the machine learning algorithm to predict a best action, from a set of predefined actions. The best action may include actions for the BS and/or actions for the UE to configure a data transmission configuration. For example, the best action may include the selection of a an MCS, a channel rank, a transmission precoder at the BS, a first analog precoder at the UE, a second analog precoder at the BS, a first digital precoder at the UE, a second digital precoder at the BS, a RV, a DMRS configuration, a resource allocation, or a combination of the above for a subsequent transmission.

For each state index, there is an action (e.g., an optimal or best action), which, if performed, will result in a reward parameter or, in other words, a maximized or minimized objective function. The reward parameter may identify a signal throughput, a spectral efficiency, a minimum BLER, a minimum delay, a minimum number of retransmissions, a target BLER associated with an URLLC, a target latency associated with URLLC, best analog and digital precoders at the UE side, or combination thereof. The action may be an action to configure a transmission configuration predicted to achieve the reward.

At 514, BS 110a signals UE 120a one or more actions. The actions may be one or more actions already taken by BS 110a, one or more decided actions to be taken by BS 110a, one or more actions to be a taken by UE 120a, or a subset of the actions. BS 110a may signal the actions through DCI. BS 110a may either signal the one or more actions separately or as a bundled information. To signal the one or more actions as a bundled information, BS 110a may signal UE 120a an index representing the actions. In some examples, BS 110a configures UE 120a with a set of actions, via RRC or MAC-CE signaling, and a mapping to indices, and the index corresponding to the set of actions taken and/or to be taken is then signaled to UE 120a in DCI.

In some examples, the one or more actions determined utilizing a machine learning-based algorithm, as shown in FIG. 5, may be configure a predicted improved data transmission configuration to achieve a target BLER associated with URLLC. The improved data transmission configuration may be associated with a reward parameter which helps to maintain the desired BLER and/or latency targets for URLLC.

Although not shown in FIG. 5, utilizing a machine learning-based algorithm may involve training a model, such as a predictive model. The model may be used to predict best actions based on the current state. For example, a best action may correspond to an action predicted most likely to achieve a desired award. The model may take the current super state, maintained by BS 110*a*, as input to the model. The model may be used to perform the prediction(s) discussed above, to determine a data transmission configuration. The model may be trained based on training data (e.g., training information), which may include channel conditions parameters, states, actions, and associated rewards.

Figure 6:
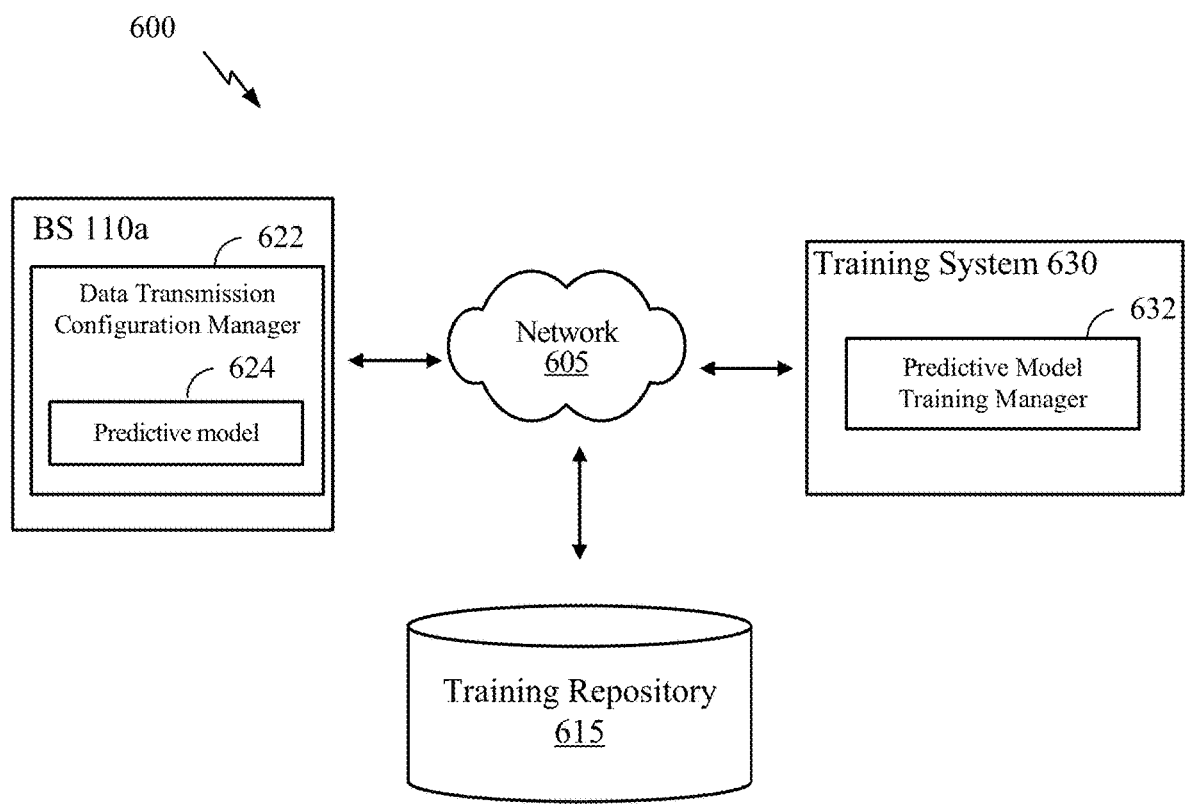
FIG. 6 illustrates an example networked environment in which a predictive model is used, according with certain aspects of the present disclosure.

FIG. 6 illustrates an example networked environment 600 in which a data transmission configuration manager 622 of a BS 110 uses a predictive model 624 for determination of a data transmission configuration, according to certain aspects of the present disclosure. As shown in FIG. 6, networked environment 600 includes a BS 110, a training system 630, and a training repository 615, communicatively connected via network(s) 605. Network(s) 605 may include a wireless network such as wireless communication network 100. Although training system 630, BS 110*a*, and training repository 615 are illustrated as separate components in FIG. 6, training system 630, BS 110*a*, and/or training repository 615 may be implemented on any number of computing systems, either as one or more standalone systems or in a distributed environment.

Training system 630 generally includes a predictive model training manager 632 that uses training data to generate predictive model 624 for predicting a data transmission configuration to achieve a desired award, based on a current state. Predictive model 624 may be trained based, at least in part, on the information in training repository 615.

Training repository 615 may include training data obtained before and/or after deployment of BS 110*a*. BS 110*a* may be trained in a simulated communication environment (e.g., in field testing, drive testing) prior to deployment of BS 110*a*. This information can be stored in training repository 615. After deployment, training repository 615 can be updated to include feedback associated with data transmission configuration used by BS 110*a*. Training repository 615 can also be updated with information from other BSs and/or other UEs, for example, based on learned experience by those BSs and UEs.

Predictive model training manager 632 may use the information in training repository 615 to determine (e.g., generate) predictive model 624 used for determining a data transmission configuration. Predictive model training manager 632 may use various different types of machine learning algorithms to form predictive model 624. Training system 630 may be located on BS 110*a* or on a different entity that determines predictive model 624. If located on a different entity, then predictive model 624 is provided to BS 110*a*. Training repository 615 may be a storage device, such as a memory. Training repository 615 may be located on BS 110*a*, training system 630, in cloud storage, or another entity in network 605. Training repository 615 may receive training information from BS 110*a*, entities in network 605 (e.g., UEs in the network 605), the cloud, or other sources.

The machine learning may use any appropriate machine learning algorithm. In some non-limiting examples, the machine learning algorithm is a reinforcement learning algorithm, a value reinforcement algorithm, a supervised learning algorithm, an unsupervised learning algorithm, a deep learning algorithm, an artificial neural network algorithm, a Q-learning algorithm, a polar reinforcement algorithm, or other type of machine learning algorithm.

In some examples, the machine learning (e.g., used by training system 630) is performed using a deep convolutional network (DCN). DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In some examples, the machine learning (e.g., used by training system 630) is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots. Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the BS's output signal or "output activation." The weight values may initially be determined by an iterative flow of training data through the network (e.g., weight values are established during a training phase in which the network learns how to identify particular classes by their typical input data characteristics).

Different types of artificial neural networks can be used to implement machine learning (e.g., used by training system 630), such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, when using a machine learning algorithm, training system 630 generates vectors from the information in training repository 615. In some examples, training repository 615 stores vectors. In some examples, the vectors map one or more features to a label. For example, the features may correspond to various one or more actions for a data transmission configuration and/or various states. The label may correspond to various predicted outcomes for those actions and states. Predictive model training manager 632 may use the vectors to train predictive model 624 for BS 110a. As discussed above, the vectors may be associated with weights in the machine learning algorithm.

Figure 7:
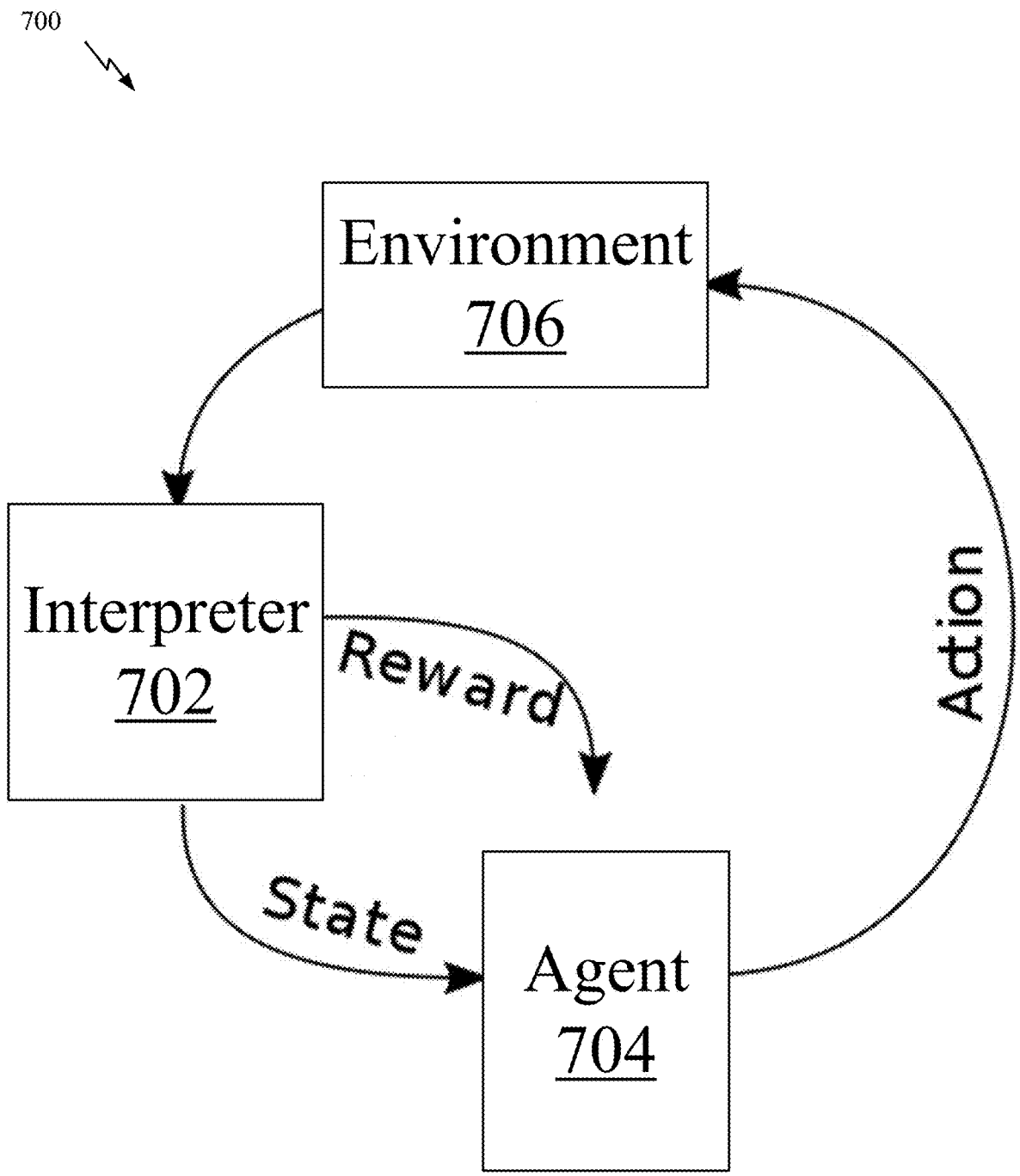
FIG. 7 conceptually illustrates an example reinforcement learning model, in accordance with certain aspects of the present disclosure.

FIG. 7 conceptually illustrates an example reinforcement learning model. Reinforcement learning may be a semi-supervised learning model in machine learning. Reinforcement learning allows an agent 704 (e.g., BS 110a) to take actions (e.g., data transmission configuration) based on states (e.g., a super state including a state received from a UE) observed by an interpreter 702 (e.g., such as the UE 120a) and interact with an environment 706 (e.g., the wireless communication network 100) so as to maximize the total rewards (e.g., a signal throughput, a spectral efficiency, a minimum BLER, a minimum delay, a minimum number of retransmissions, a target BLER associated with an URLLC, a target latency associated with URLLC, best analog and digital precoders at the UE side, or combination thereof) which may be observed by interpreter 702 and fed back to agent 704 as reinforcement.

In some examples, machine learning is modeled as a Markov Decision Process (MDP). A MDP is a discrete, time stochastic, control process. The MDP provides a mathematical framework for modeling decision making in situations where outcomes may be partly random and partly under the control of a decision maker. In MDP, at each time step, the process is in a state, of a set of S finite states, and the decision maker may choose any action, of a finite set of actions A, that is available in that state. The process responds at the next time step by randomly moving into a new state, and giving the decision maker a corresponding reward, where $R_\alpha(s,s')$ is the immediate reward (or expected immediate reward) after transitioning from state s to state s'. The probability that the process moves into its new state is influenced by the chosen action, for example, according to a state transition function. The state transition may be given by $P_\alpha(s,s')=Pr\ (s_{t+1}=s'|s_t=s,\alpha_t=\alpha)$.

An MDP seeks to find a policy for the decision: a function of π that specifies the action π(s) that the decision maker will choose when in state s. The goal is to choose a policy π that maximizes the rewards. For example, a policy that maximizes a cumulative function of the rewards, such as a discounted summation. The following shows an example function:

$$\Sigma_{t=0}^{\infty} \gamma^t R_{\alpha t}(s_t, s_{t+1}), \text{ where}$$

$\alpha_t=\pi(s_t)$, the action given by the policy, and γ is the discount factor and satisfies $0 \le \gamma \le 1$.

The solution for the MDP is a policy which describes the best action for each state in the MDP, for example that maximizes the expected discounted reward.

In some examples, a partially observable MDP is used (POMDP). POMDP may be used when the state may not be known when the action is taken, and, therefore, the probabilities and/or rewards may be unknown. For POMDP, reinforcement learning may be used. The following function may be defined:

$$Q(s,a)=\Sigma_{s'} P_\alpha(s,s')(R_\alpha(s,s')+\gamma V(s')),$$

where V(s') is the discounted cumulative reward.

Experience during learning may be based on (s,a) pairs together with the outcome s'. For example, if the node was previously in a state s, and made a base station analog/digital precoders, MCS, RV index, DMRS configuration, resource allocation selection (among other actions) a, and achieved a throughput s'. In this example, the node may update the array Q directly based on the learned experience. This may be referred to as Q-learning. In some examples, the learning algorithm may be continuous.

Referring back to the example networked environment 600 in FIG. 6 and reinforcement learning model 700 in FIG. 7, in some examples, predictive model training manager 632 or agent 704 may use reinforcement learning for a predictive model (e.g., predictive model 624) to determine the policy (e.g., to solve for the MDP solution). BS 110a or agent 704 may take an action, such as a data transmission configuration, based on the policy given by the predictive model (e.g., predictive model 624) for a current state (e.g., observed by UE 120a or interpreter 702), at a given time, in the environment (e.g., environment 706). The reinforcement learning algorithm and predictive model may be updated/adapted based on learned experience (e.g., which may be stored in training repository 615).

The framework of reinforcement learning provides the tools to optimally solve the POMDP. The learning changes the weights of the multi-level perceptron (e.g., the neural net) that decides on the next action to take. The algorithm in deep ML is encoded in the neural net weights. Thus, changing the weights changes the algorithm.

In some examples, the machine learning-based data transmission configuration uses a deep learning algorithm. The deep learning algorithm may be a deep Q network (DQN) algorithm implemented by a neural network.

In some examples, the machine learning algorithm is modeled as a POMDP with reinforcement learning. A POMDP can be used when the state may not be known when the action is taken, and, therefore, the probabilities and/or rewards may be unknown. For POMDP, reinforcement learning may be used. The Q array may be defined as:

$$Q_{i+1}(s,a)=E\{r+\gamma \max Q_i(s',a')|s,a\}.$$

According to certain aspects, the machine learning-based data transmission configuration allows for continuous infinite learning. In some examples, the learning may be augmented with federated learning. For example, while some machine learning approaches use a centralized training data on a single machine or in a data center; with federated learning, the learning may be collaborative involving multiple devices to form the predictive model. With federated learning, training of the model can be done on the device, with collaborative learning from multiple devices. For example, referring back to FIGS. 6-7, BS 110a and agent 704 can receive training information and/or updated trained models, from various different devices.

In an illustrative example, multiple different BSs' machine learning data transmission configuration algorithm can be trained in multiple different scenarios of operation, for example, using deep reinforcement learning. The output of the training from the different BSs can be combined to train the beam management algorithm for the BSs. As discussed above, the state may be the observed channel condition parameters by the UE; the action may be the data transmission configuration; and the reward may be the URLLC reliability and/or latency targets.

Figure 8:
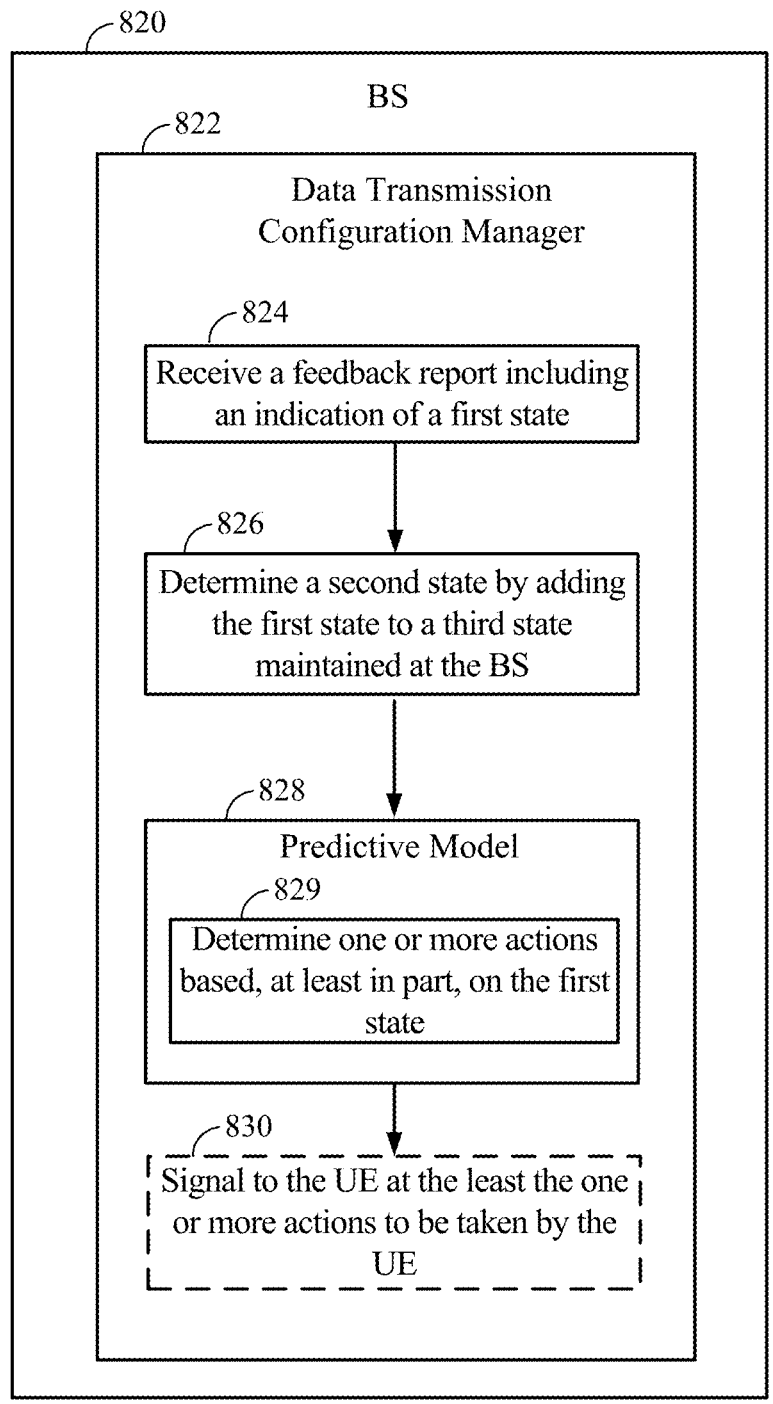
FIG. 8 illustrates an example node in a networked environment in which a predictive model is used for determination a transmission configuration, according with certain aspects of the present disclosure.

As shown in FIG. 8, a BS 820 (e.g., such as BS 110a in the networked environment 600 shown in FIG. 6) may include a data transmission configuration manager 822. Data transmission configuration manager 822 may receive a feedback report from a UE (e.g., UE 120a) including an indication of a first state (e.g., a state index value of the first state) corresponding to a plurality of channel condition parameters (824). Data transmission configuration manager 822 may add the received first state to a third state maintained at BS 820 to determine a second state (826). Data transmission configuration manager 822 may include a predictive model 828 (e.g., such as predictive model 624). Data transmission configuration manager uses predictive model 828 to determine one or more actions based, at least in part, on the first state (829). BS 820 may signal to a UE at least one or more actions to be taken by the UE (830).

Figure 9:
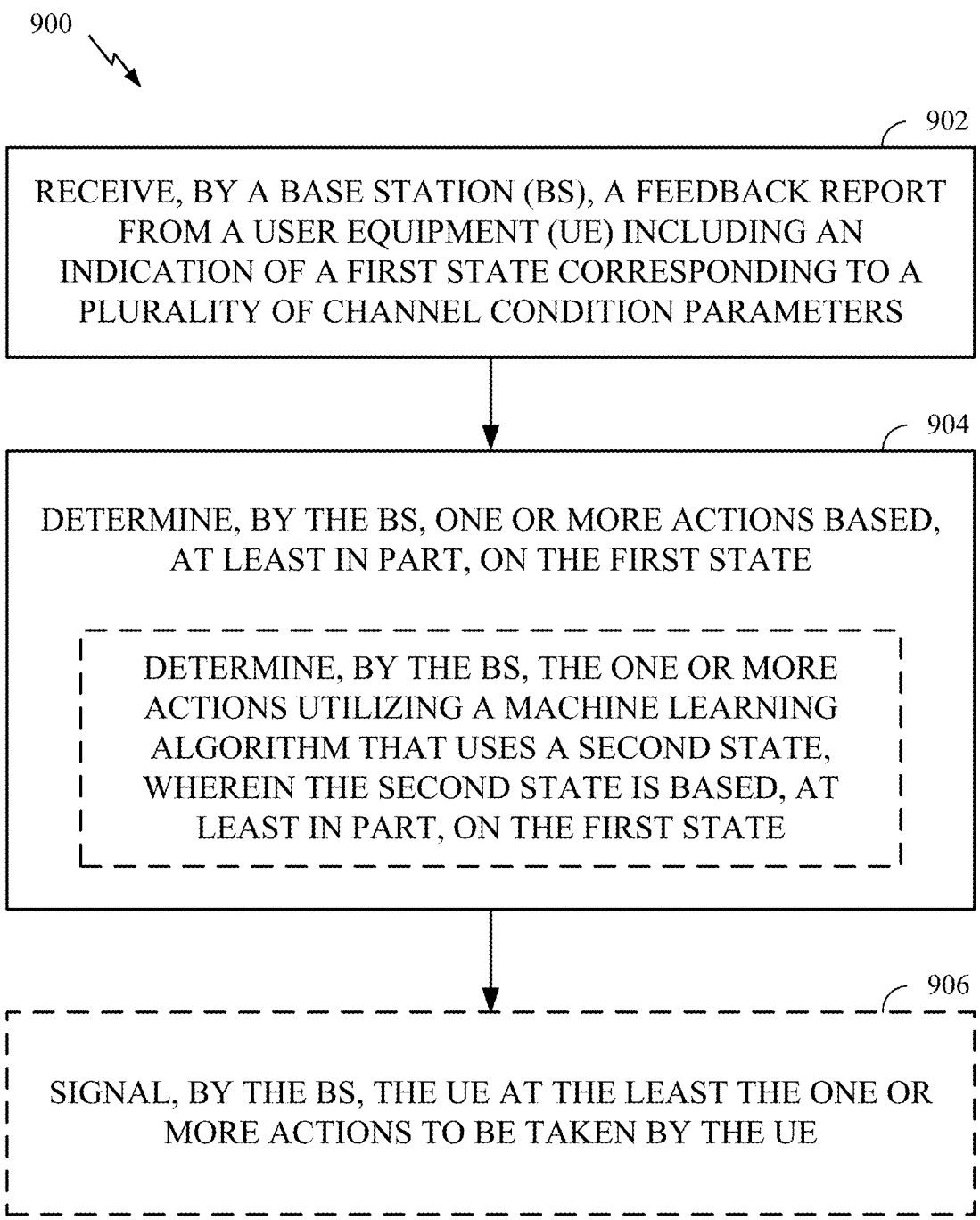
FIG. 9 is a flow diagram illustrating example operations for wireless communication by a BS, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as BS 110a in wireless communication network 100). Operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 900 may begin, at 902, by receiving a feedback report from a UE including an indication of a first state corresponding to a plurality of channel condition parameters. The feedback report may include a HARQ ACK report for a previous transmission by the BS, a CSI report, or both. In some examples, the plurality of channel condition parameters includes one or more of: BLER, number of negative acknowledged CBs, number of NACKed CBGs, CQI, SPEF, SNR, LLR quality, parity check status, best observed RV, current analog precoder used at the UE, current digital precoder used at the UE, best observed analog precoder at the UE, best observed digital precoder at the UE, best observed DMRS configuration, current interference pattern in frequency and/or time, current interference covariance matrix rank, current interference power, current interference covariance matrix eigen-values, best resource allocation at the UE, or a combination thereof.

At 904, the BS determines one or more actions based, at least in part, on a first state. In some examples, determining the one or more actions based, at least in part of the first state includes determining the one or more actions utilizing a machine learning algorithm that uses a second state, wherein the second state is based, at least in part, on the first state. Determining the one or more actions utilizing a machine learning algorithm may include determining one or more of: a MCS, a channel rank, a transmission precoder at the BS, a first analog precoder at the UE, a second analog precoder at the BS, a first digital precoder at the UE, a second digital precoder at the BS, a RV, a DMRS configuration, a resource allocation, or a combination thereof for a subsequent transmission. In some examples, the machine learning may use the state associated with the plurality of channel conditions, a reward parameter associated with a signal throughput, spectral efficiency, a minimum BLER, a minimum delay, a minimum number of retransmissions, a target BLER associated with an URLLC, a target latency associated with URLLC, or combination thereof, and an action parameter associated with one or more parameters associated with a subsequent transmission. In some examples, the one or more actions may include one or more actions to be taken by the BS, one or more actions to be taken by the UE, or a combination thereof.

In some examples, the machine learning algorithm includes a reinforcement learning algorithm, a deep learning algorithm, a supervised learning algorithm, an unsupervised learning algorithm, a Q-learning algorithm, a value reinforcement algorithm, a polar reinforcement algorithm, or a combination thereof. The machine learning algorithm may be modeled as a Markov Decision Process (MDP).

In some examples, the machine learning algorithm is implemented by an artificial neural network. The artificial neural network may include a deep Q network (DQN) comprising one or more deep neural networks (DNNs) and the determining the one or more actions using the machine learning may include passing the one or more second state and one or more action parameters through the one or more DNNs, outputting a value for each action parameter, and selecting an action associated with a best output value.

Operations 900 may further include the BS configuring the UE with a mapping of state indices to channel condition parameters. The indication of the first state is one of the state indices. In some examples, the configuring is via RRC signaling or MAC-CE signaling.

Operations 900 may further include the BS configuring the UE with a number of states to maintain at the UE, channel conditions parameters associated with the states, or both. In some examples, the configuring is via RRC signaling or MAC-CE signaling.

Operations 900 may further include the BS configuring the UE with quantization levels for one or more of the plurality of channel condition parameters. In some examples, the configuring is via RRC signaling or MAC-CE signaling.

Operations 900 may further include the BS determining the second state by adding the first state to a third state maintained at the BS. In some examples, the third state corresponds to one or more of: a current resource allocation, a digital precoder at the BS, an analog precoder at the BS, a current MCS, a current data rank, a current action, a current DMRS configuration, a current transmit power, or a combination thereof.

Operations 900 may further include the BS signaling the UE at the least the one or more actions to be taken by the UE. The signaling may include signaling each of the one or more actions separately or signaling the one or more actions together via an index mapping to a plurality of actions.

The operations 900 may further include the BS sending RRC signaling or MAC-CE signaling indicating the mapping and the signaling includes a DCI including the index.

Figure 10:
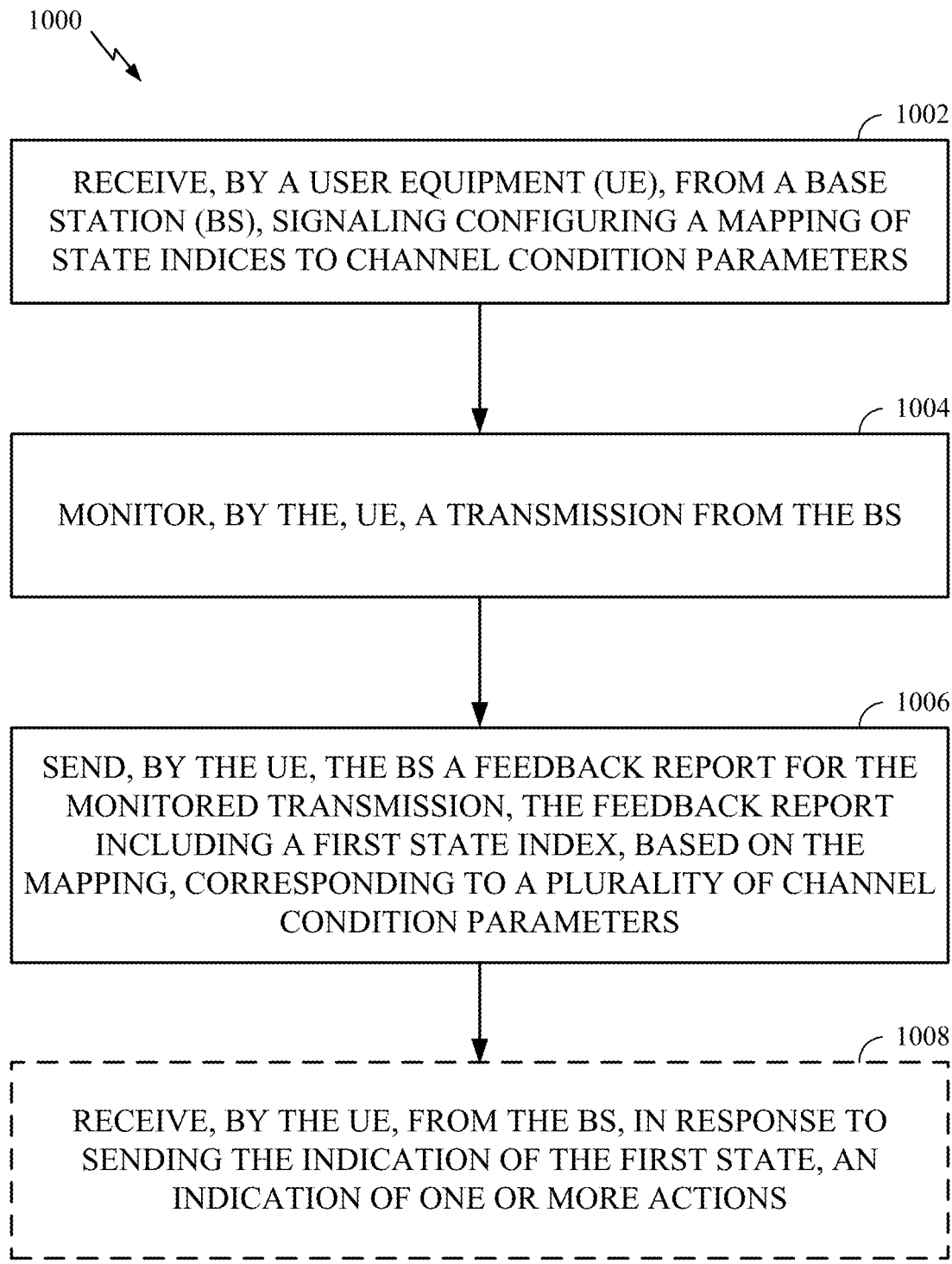
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. Operations 1000 may be performed, for example, by a UE (e.g., such as UE 120a in wireless communication network 100). Operations 1000 may be complimentary to operations 900 performed by the BS. Operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1000 may begin, at 1002, by the UE receiving from a BS signaling configuring a mapping of state indices to channel condition parameters. In some examples, the configuring is via RRC signaling or MAC-CE signaling.

At 1004, the UE monitors a transmission from the BS.

At 1006, the UE sends the BS a feedback report for the monitored transmission, the feedback report including an indication of a first state index, based on the mapping, corresponding to a plurality of channel condition parameters. The feedback report may include a HARQ ACK report for a previous transmission by the BS, a CSI report, or both. In some examples, the channel condition parameters may include one or more of: BLER, number of negative acknowledged CBs, number of NACKed CBGs, CQI, SPEF, SNR, LLR quality, parity check status, best observed RV, current analog precoder used at the UE, current digital precoder used at the UE, best observed analog precoder at the UE, best observed digital precoder at the UE, best observed DMRS configuration, current interference pattern in frequency and/or time, current interference covariance matrix rank, current interference power, current interference covariance matrix eigen-values, best resource allocation at the UE, or a combination thereof.

Operations 1000 may further include the UE receiving, from the BS, a configuration of a number of states to maintain at the UE, channel conditions parameters associated with the states, or both. In some examples, the configuring is via RRC signaling or MAC-CE signaling.

Operations at 1000 may further include the UE receiving a configuration from the BS of quantization levels for one or more of the plurality of channel condition parameters. In some examples, the configuring is via RRC signaling or MAC-CE signaling.

Operations 1000 may further include, at 1008, the UE, in response to sending the indication of the first state, receives, from the BS, an indication of one or more actions. The one or more actions may be each indicated separately or the one or more actions may be indicated together via an index mapping to a plurality of actions. In some examples, the one or more actions may include one or more of: a MCS, a channel rank, a transmission precoder at the BS, a first analog precoder at the UE, a second analog precoder at the BS, a first digital precoder at the UE, a second digital precoder at the BS, a RV, a DMRS configuration, a resource allocation, or a combination thereof for a subsequent transmission. In some examples, the one or more actions include one or more actions to be taken by the BS, one or more actions to be taken by the UE, or a combination thereof.

Figure 11:
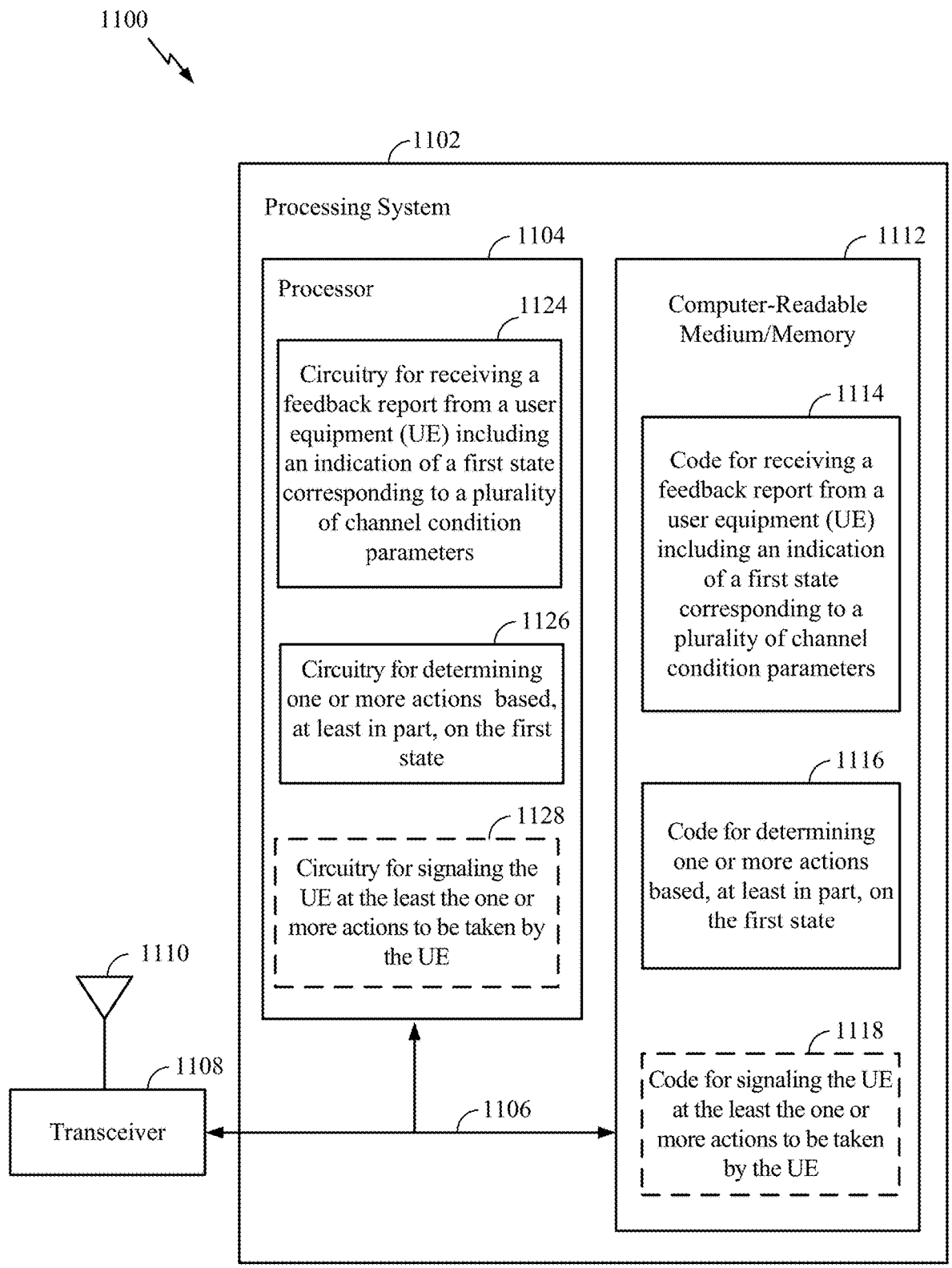
FIG. 11 illustrates a communications device, in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108 (e.g., a transmitter and/or a receiver). Transceiver 1108 is configured to transmit and receive signals for communications device 1100 via an antenna 1110, such as the various signals as described herein. Processing system 1102 may be configured to perform processing functions for communications device 1100, including processing signals received and/or to be transmitted by communications device 1100.

Processing system 1102 includes a processor 1104 coupled to a computer-readable medium/memory 1112 via a bus 1106. In certain aspects, computer-readable medium/memory 1112 is configured to store instructions (e.g., computer-executable code) that when executed by processor 1104, cause processor 1104 to perform the operations illustrated in FIG. 9, or other operations for performing the various techniques discussed herein for data transmission configuration utilizing a machine-learning based algorithm. In certain aspects, computer-readable medium/memory 1112 stores code 1114 for receiving a feedback report from a UE including an indication of a first state corresponding to a plurality of channel condition parameters; code 1116 for determining one or more actions based, at least in part, on the first state; code 1118 for signaling the UE at the least the one or more actions to be taken by the UE, etc. In certain aspects, processor 1104 has circuitry configured to implement the code stored in computer-readable medium/memory 1112. Processor 1104 includes circuitry 1124 for receiving a feedback report from a UE including an indication of a first state corresponding to a plurality of channel condition parameters; circuitry 1126 for determining one or more actions based, at least in part, on the first state; circuitry 1128 for signaling the UE at the least the one or more actions to be taken by the UE, etc.

Figure 12:
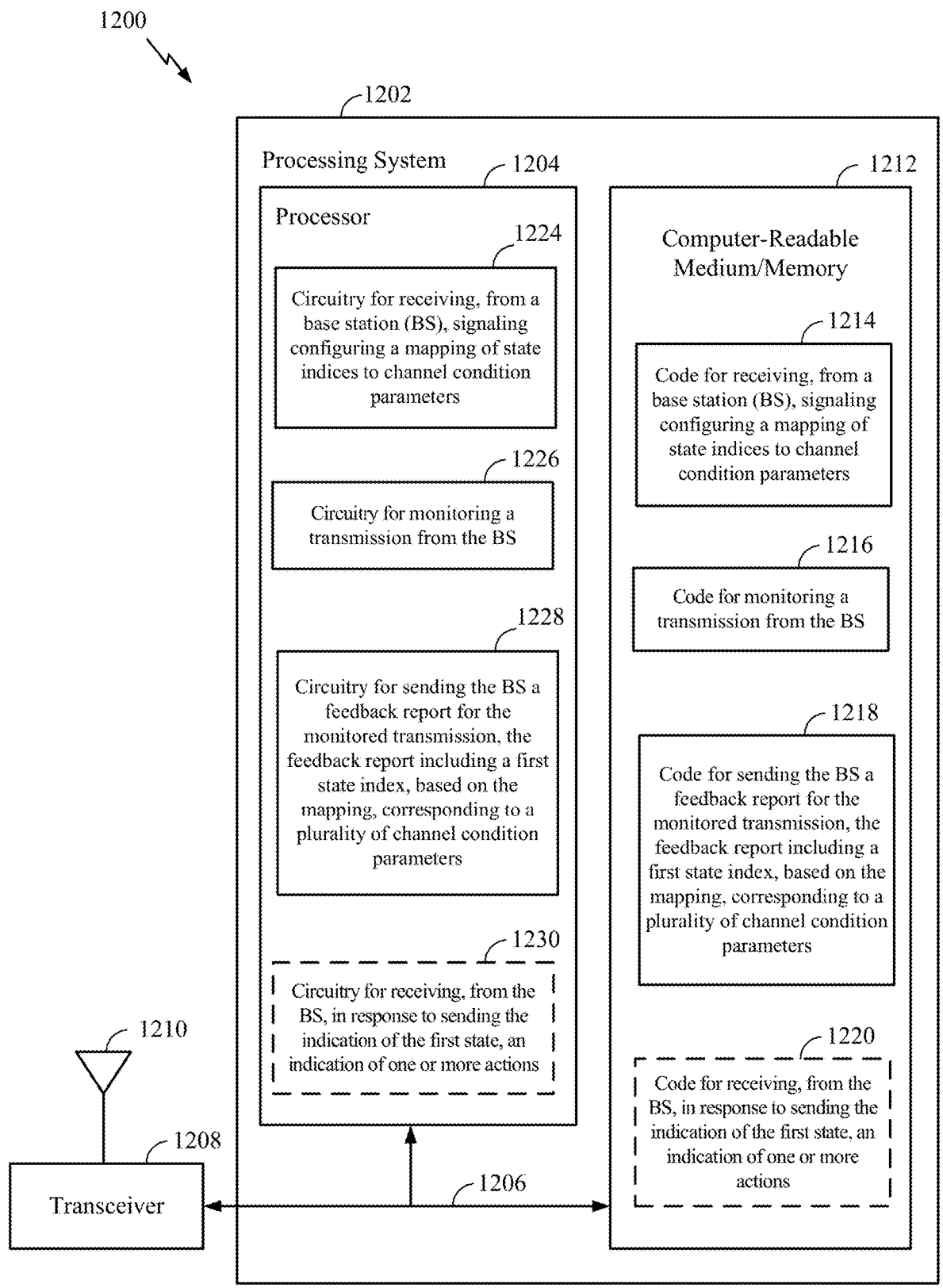
FIG. 12 illustrates a communications device, in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. Communications device 1200 includes a processing system 1202 coupled to a transceiver 1208 (e.g., a transmitter and/or a receiver). Transceiver 1208 is configured to transmit and receive signals for communications device 1200 via an antenna 1210, such as the various signals as described herein. Processing system 1202 may be configured to perform processing functions for communications device 1200, including processing signals received and/or to be transmitted by communications device 1200.

Processing system 1202 includes a processor 1204 coupled to a computer-readable medium/memory 1212 via a bus 1206. In certain aspects, computer-readable medium/memory 1212 is configured to store instructions (e.g., computer-executable code) that when executed by processor 1204, cause processor 1204 to perform the operations illustrated in FIG. 10, or other operations for performing the various techniques discussed herein for data transmission configuration utilizing a machine-learning based algorithm. In certain aspects, computer-readable medium/memory 1212 stores code 1214 for receiving from a BS signaling configuring a mapping of state indices to channel condition parameters; code 1216 for monitoring a transmission from the BS; code 1218 for sending the BS a feedback report for the monitored transmission, the feedback report including an indication of a first state index, based on the mapping, corresponding to a plurality of channel condition parameters; code 1220 for receiving, from the BS, in response to sending the indication of the first state, an indication of one or more actions, etc. In certain aspects, processor 1204 has circuitry configured to implement the code stored in computer-readable medium/memory 1212. Processor 1204 includes circuitry 1224 for receiving from a BS signaling configuring a mapping of state indices to channel condition parameters; circuitry 1226 for monitoring a transmission from the BS; circuitry 1228 for sending the BS a feedback report for the monitored transmission, the feedback report including an indication of a first state index, based on the mapping, corresponding to a plurality of channel condition parameters; circuitry 1230 for receiving, from the BS, in response to sending the indication of the first state, an indication of one or more actions, etc.

Example Aspects

In addition to the various aspects described above, the aspects can be combined. Some specific combinations of aspects are detailed below:

Aspect 1: A method for wireless communication by a base station (BS), comprising: receiving a feedback report from a user equipment (UE) including an indication of a first state corresponding to a plurality of channel condition parameters; and determining one or more actions based, at least in part, on the first state.

Aspect 2: The method of aspect 1, wherein determining the one or more actions based, at least in part, on the first state comprises determining the one or more actions utilizing a machine learning algorithm that uses a second state, wherein the second state is based, at least in part, on the first state.

Aspect 3: The method of any of aspects 1 or 2, further comprising configuring the UE with a mapping of state indices to channel condition parameters, wherein the indication of the first state comprises one of the state indices.

Aspect 4: The method of any of aspect 1-3, further comprising configuring the UE with a number of states to maintain at the UE, channel conditions parameters associated with the states, or both.

Aspect 5: The method of any of aspect 1-4, wherein the feedback report comprises a hybrid automatic repeat request (HARD) acknowledgement (ACK) report for a previous transmission by the BS, a channel state information (CSI) report, or both.

Aspect 6: The method of any aspects 1-5, wherein the plurality of channel condition parameters include one or more of: block error rate (BLER), number of negative acknowledged code blocks (CBs), number of NACKed CB groups (CBGs), channel quality indicator (CQI), spectral efficiency (SPEF), signal to noise ratio (SNR), log likelihood ratio (LLR) quality, parity check status, best observed redundancy version (RV), current analog precoder used at the UE, current digital precoder used at the UE, best observed analog precoder at the UE, best observed digital precoder at the UE, best observed demodulation reference signal (DMRS) configuration, current interference pattern in frequency and/or time, current interference covariance matrix rank, current interference power, current interference covariance matrix eigen-values, best resource allocation at the UE, or a combination thereof.

Aspect 7: The method of aspect 6, further comprising configuring the UE with quantization levels for one or more of the plurality of channel condition parameters.

Aspect 8: The method of any of aspects 1-7, wherein the configuring is via radio resource control (RRC) signaling or medium access control (MAC) control element (CE) signaling.

Aspect 9: The method of any of aspects 2-8, further comprising determining the second state by adding the first state to a third state maintained at the BS.

Aspect 10: The method of aspect 9, wherein the third state corresponds to one or more of: a current resource allocation, a digital precoder at the BS, an analog precoder at the BS, a current modulation and coding scheme (MCS), a current data rank, a current action, a current demodulation reference signal (DMRS) configuration, a current transmit power, or a combination thereof.

Aspect 11: The method of any of aspects 2-10, wherein determining the one or more actions utilizing a machine learning algorithm includes determining one or more of: a modulation and coding scheme (MCS), a channel rank, a transmission precoder at the BS, a first analog precoder at the UE, a second analog precoder at the BS, a first digital precoder at the UE, a second digital precoder at the BS, a redundancy version (RV), a demodulation reference signal (DMRS) configuration, a resource allocation, or a combination thereof for a subsequent transmission.

Aspect 12: The method of any of aspects 2-11, wherein the machine learning algorithm comprises a reinforcement learning algorithm, a deep learning algorithm, a supervised learning algorithm, an unsupervised learning algorithm, a Q-learning algorithm, a value reinforcement algorithm, a polar reinforcement algorithm, or a combination thereof.

Aspect 13: The method of any of aspects 2-12, wherein the machine learning algorithm is modeled as a Markov Decision Process (MDP).

Aspect 14. The method of any of aspects 2-13, wherein the machine learning algorithm is implemented by an artificial neural network.

Aspect 15: The method of aspect 14, wherein: the artificial neural network comprises a deep Q network (DQN) comprising one or more deep neural networks (DNNs); and the determining the one or more actions using the machine learning includes: passing the one or more second state and one or more action parameters through the one or more DNNs; outputting a value for each action parameter; and selecting an action associated with a best output value.

Aspect 16: The method of any of aspects 2-15, wherein the machine learning uses the state associated with the plurality of channel conditions, a reward parameter associated with a signal throughput, spectral efficiency, a minimum block error rate (BLER), a minimum delay, a minimum number of retransmissions, a target BLER associated with an ultra-reliable low-latency communication (URLLC), a target latency associated with URLLC, or combination thereof, and an action parameter associated with one or more parameters associated with a subsequent transmission.

Aspect 17: The method of any of aspects 1-16, wherein the one or more actions include one or more actions to be taken by the BS, one or more actions to be taken by the UE, or a combination thereof.

Aspect 18: The method of any of aspects 1-17, further comprising signaling the UE at the least the one or more actions to be taken by the UE.

Aspect 19: The method of aspect 18, wherein the signaling includes: signaling each of the one or more actions separately; or signaling the one or more actions together via an index mapping to a plurality of actions.

Aspect 20: The method of aspect 19, wherein: the method further comprises sending radio resource control (RRC) signaling or medium access control (MAC) control element (CE) signaling indicating the mapping; and the signaling comprises a DCI including the index.

Aspect 21: A method for wireless communication by a user equipment (UE), comprising: receiving from a base station (BS) a configuration of a mapping of state indices to channel condition parameters; monitoring a transmission from the BS; and sending the BS a feedback report for the monitored transmission, the feedback report including an indication of a first state, based on the mapping, corresponding to a plurality of channel condition parameters.

Aspect 22: The method of aspect 21, further comprising receiving, from the BS, a configuration of a number of states to maintain at the UE, channel conditions parameters associated with the states, or both.

Aspect 23: The method of any of aspects 21 or 22, wherein the feedback report comprises a hybrid automatic repeat request (HARD) acknowledgement (ACK) report for a previous transmission by the BS, a channel state information (CSI) report, or both.

Aspect 24: The method of any of aspects 21-23, wherein the channel condition parameters include one or more of: block error rate (BLER), number of negative acknowledged code blocks (CBs), number of NACKed CB groups (CBGs), channel quality indicator (CQI), spectral efficiency (SPEF), signal to noise ratio (SNR), log likelihood ratio (LLR) quality, parity check status, best observed redundancy version (RV), current analog precoder used at the UE, current digital precoder used at the UE, best observed analog precoder at the UE, best observed digital precoder at the UE, best observed demodulation reference signal (DMRS) configuration, current interference pattern in frequency and/or time, current interference covariance matrix rank, current interference power, current interference covariance matrix eigen-values, best resource allocation at the UE, or a combination thereof.

Aspect 25: The method of any of aspects 21-24, further comprising receiving a configuration from the BS of quantization levels for one or more of the plurality of channel condition parameters.

Aspect 26: The method of any of claim 21, 22, or 25, wherein the configuring is via radio resource control (RRC) signaling or medium access control (MAC) control element (CE) signaling.

Aspect 27: The method of any of aspects 21-26, further comprising, in response to sending the indication of the first state, receiving, from the BS, an indication of one or more actions.

Aspect 28: The method of aspect 27, wherein the one or more actions includes one or more of: a modulation and coding scheme (MCS), a channel rank, a transmission precoder at the BS, a first analog precoder at the UE, a second analog precoder at the BS, a first digital precoder at the UE, a second digital precoder at the BS, a redundancy version (RV), a demodulation reference signal (DMRS) configuration, a resource allocation, or a combination thereof for a subsequent transmission.

Aspect 29: The method of aspect 27, wherein the one or more actions include one or more actions to be taken by the BS, one or more actions to be taken by the UE, or a combination thereof.

Aspect 30: The method of aspect 27, wherein: the one or more actions are each indicated separately; or the one or more actions are indicated together via an index mapping to a plurality of actions.

Aspect 31: An apparatus comprising means for performing the method of any of aspects 1 through 30.

Aspect 31: An apparatus comprising at least one processor and a memory coupled to the at least one processor, the memory comprising code executable by the at least one processor to cause the apparatus to perform the method of any of aspects 1 through 30.

Aspect 32: A computer readable medium storing computer executable code thereon for wireless communications that, when executed by at least one processor, cause an apparatus to perform the method of any of aspects 1 through 30.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, comprising:
   at least one processor; and
   a memory coupled to the at least one processor, the memory comprising code executable by the at least one processor to cause the apparatus to:
      receive a feedback report, from a user equipment (UE), including a first state index, wherein the first state index is mapped to a plurality of channel condition parameters; and determine one or more actions based, at least in part, on the first state index, wherein the code executable by the at least one processor to cause the apparatus to determine the one or more actions based, at least in part, on the first state comprises code executable by the at least one processor to cause the apparatus to determine the one or more actions utilizing a machine learning algorithm that uses a second state, wherein the second state is based, at least in part, on the first state index.

2. The apparatus of claim 1, wherein the memory further comprises code executable by the at least one processor to cause the apparatus to:
determine the second state by adding the first state index to a third state maintained at a base station (BS).

3. The apparatus of claim 2, wherein the third state corresponds to one or more of: a current resource allocation, a digital precoder at the apparatus, an analog precoder at the apparatus, a current modulation and coding scheme (MCS), a current data rank, a current action, a current demodulation reference signal (DMRS) configuration, a current transmit power, or a combination thereof.

4. The apparatus of claim 1, wherein the code executable by the at least one processor to cause the apparatus to determine the one or more actions utilizing a machine learning algorithm comprises code executable by the at least one processor to cause the apparatus to determine one or more of: a modulation and coding scheme (MCS), a channel rank, a transmission precoder at the apparatus, a first analog precoder at the UE, a second analog precoder at the apparatus, a first digital precoder at the UE, a second digital precoder at the apparatus, a redundancy version (RV), a demodulation reference signal (DMRS) configuration, a resource allocation, or a combination thereof for a subsequent transmission.

5. The apparatus of claim 1, wherein the code executable by the at least one processor to cause the apparatus to determine the one or more actions utilizing a machine learning algorithm comprises code executable by the at least one processor to cause the apparatus to determine the one or more actions utilizing a reinforcement learning algorithm, a deep learning algorithm, a supervised learning algorithm, an unsupervised learning algorithm, a Q-learning algorithm, a value reinforcement algorithm, a polar reinforcement algorithm, or a combination thereof.

6. The apparatus of claim 1, wherein the machine learning algorithm is modeled as a Markov Decision Process (MDP).

7. The apparatus of claim 1, wherein the machine learning algorithm is implemented by an artificial neural network.

8. The apparatus of claim 7, wherein:
the artificial neural network comprises a deep Q network (DQN) comprising one or more deep neural networks (DNNs); and
the code executable by the at least one processor to cause the apparatus to determine the one or more actions using the machine learning includes code executable by the at least one processor to cause the apparatus to:
pass the second state and one or more action parameters through the one or more DNNs;
output a value for each action parameter; and
select an action associated with a best output value.

9. The apparatus of claim 1, wherein the code executable by the at least one processor to cause the apparatus to determine the one or more actions utilizing the machine learning algorithm comprises code executable by the at least one processor to cause the apparatus to input the second state to a machine learning model to predict the one or more actions that maximizes or minimizes a reward parameter, wherein the reward parameter is associated with a signal throughput, a spectral efficiency, a minimum block error rate (BLER), a minimum delay, a minimum number of retransmissions, a target BLER associated with an ultra reliable low latency communication (URLLC), a target latency associated with URLLC, or combination thereof, and wherein the one or more actions comprise selection of one or more parameters for a subsequent transmission.

10. The apparatus of claim 1, wherein the memory further comprises code executable by the at least one processor to cause the apparatus to:
signal to the UE at least one action, of the one or more actions, to be taken by the UE.

11. The apparatus of claim 10, wherein the code executable by the at least one processor to cause the apparatus to signal the UE the at least one action to be taken by the UE of the one or more actions includes code executable by the at least one processor to cause the apparatus to:
signal each one or more actions separately; or
signal a plurality of actions together via an index mapped to the plurality of actions.

12. The apparatus of claim 1, wherein the memory further comprises code executable by the at least one processor to cause the apparatus to:
configure the UE with a mapping of state indexes, including the first state index, to channel condition parameters.

13. The apparatus of claim 12, wherein the configuring is via radio resource control (RRC) signaling or medium access control (MAC) control element (CE) signaling.

14. The apparatus of claim 1, wherein the memory further comprises code executable by the at least one processor to cause the apparatus to:
configure the UE with a number of states to maintain at the UE.

15. The apparatus of claim 1, wherein the feedback report comprises a hybrid automatic repeat request (HARD) acknowledgement (ACK) report for a previous transmission by the apparatus, a channel state information (CSI) report, or both.

16. The apparatus of claim 1, wherein the plurality of channel condition parameters includes two or more of: a block error rate (BLER), a number of negative acknowledged (NACKed) code blocks (CBs), a number of NACKed CB groups (CBGs), a channel quality indicator (CQI), a spectral efficiency (SPEF), a signal to noise ratio (SNR), a log likelihood ratio (LLR) quality, a parity check status, a best observed redundancy version (RV), a current analog precoder used at the UE, a current digital precoder used at the UE, a best observed analog precoder at the UE, a best observed digital precoder at the UE, a best observed demodulation reference signal (DMRS) configuration, a current interference pattern in frequency, a current interference pattern in time, a current interference covariance matrix rank, a current interference power, one or more current interference covariance matrix eigen-values, a best resource allocation at the UE, or a combination thereof.

17. The apparatus of claim 1, wherein the memory further comprises code executable by the at least one processor to cause the apparatus to:
configure the UE with one or more quantization levels for one or more of the plurality of channel condition parameters.

18. A method for wireless communication by a base station (BS), comprising:
- receiving a feedback report from a user equipment (UE) including a first state index, wherein the first state index is mapped to a plurality of channel condition parameters; and
- determining one or more actions based, at least in part, on the first state index, wherein determining the one or more actions based, at least in part, on the first state comprises determining the one or more actions utilizing a machine learning algorithm that uses a second state, wherein the second state is based, at least in part, on the first state index.

19. The method of claim 18, further comprising:
- determining the second state by adding the first state index to a third state maintained at the base station (BS).

20. The method of claim 19, wherein the third state corresponds to one or more of: a current resource allocation, a digital precoder at the apparatus, an analog precoder at the apparatus, a current modulation and coding scheme (MCS), a current data rank, a current action, a current demodulation reference signal (DMRS) configuration, a current transmit power, or a combination thereof.

21. The method of claim 18, wherein determining the one or more actions utilizing a machine learning algorithm comprises determining one or more of: a modulation and coding scheme (MCS), a channel rank, a transmission precoder at the apparatus, a first analog precoder at the UE, a second analog precoder at the apparatus, a first digital precoder at the UE, a second digital precoder at the apparatus, a redundancy version (RV), a demodulation reference signal (DMRS) configuration, a resource allocation, or a combination thereof for a subsequent transmission.

22. The method of claim 18, wherein determining the one or more actions utilizing a machine learning algorithm comprises determining the one or more actions utilizing a reinforcement learning algorithm, a deep learning algorithm, a supervised learning algorithm, an unsupervised learning algorithm, a Q-learning algorithm, a value reinforcement algorithm, a polar reinforcement algorithm, or a combination thereof.

23. The method of claim 18, wherein the machine learning algorithm is modeled as a Markov Decision Process (MDP).

24. The method of claim 18, wherein the machine learning algorithm is implemented by an artificial neural network.

25. The method of claim 24, wherein the artificial neural network comprises a deep Q network (DQN) comprising one or more deep neural networks (DNNs) and determining the one or more actions utilizing a machine learning algorithm, comprises:
- passing the second state and one or more action parameters through the one or more DNNs;
- outputting a value for each action parameter; and
- selecting an action associated with a best output value.

26. The method of claim 18, wherein determining the one or more actions utilizing the machine learning algorithm comprises:
- inputting the second state to a machine learning model to predict the one or more actions that maximizes or minimizes a reward parameter,
- wherein the reward parameter is associated with a signal throughput, a spectral efficiency, a minimum block error rate (BLER), a minimum delay, a minimum number of retransmissions, a target BLER associated with an ultra reliable low latency communication (URLLC), a target latency associated with URLLC, or combination thereof, and
- wherein the one or more actions comprise selecting one or more parameters for a subsequent transmission.

27. The method of claim 18, further comprising signaling to the UE at least one action, of the one or more actions, to be taken by the UE.

28. The method of claim 27, wherein signaling to the UE at least one action comprises:
- signaling of the each one or more actions separately; or
- signaling a plurality of actions together via an index mapped to the plurality of actions.

* * * * *